United States Patent
Gonzalez

(12) 
(10) Patent No.: US 11,967,860 B2
(45) Date of Patent: *Apr. 23, 2024

(54) SHORT-CIRCUIT CURRENT CAPACITY ENHANCEMENT

(71) Applicant: SCHNEIDER ELECTRIC IT CORPORATION, Foxboro, MA (US)

(72) Inventor: Daniel Gonzalez, Domène (FR)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 106 days.

This patent is subject to a terminal disclaimer.

(21) Appl. No.: 17/655,385

(22) Filed: Mar. 18, 2022

(65) Prior Publication Data

US 2022/0278548 A1    Sep. 1, 2022

Related U.S. Application Data

(63) Continuation of application No. 16/780,513, filed on Feb. 3, 2020, now Pat. No. 11,303,149.

(51) Int. Cl.
    *H02J 9/06* (2006.01)
    *H02M 5/42* (2006.01)

(52) U.S. Cl.
    CPC .............. *H02J 9/062* (2013.01); *H02M 5/42* (2013.01)

(58) Field of Classification Search
    CPC .......... H02J 9/062; H02M 5/42; H02M 5/458; H02M 1/32

USPC .................................. 361/44–47, 49–50, 42
See application file for complete search history.

(56) References Cited

U.S. PATENT DOCUMENTS

| | | | |
|---|---|---|---|
| 5,172,291 A | 12/1992 | Bakely et al. | |
| 8,670,257 B2* | 3/2014 | Hiramatsu | H02M 1/12 363/97 |
| 2003/0080622 A1 | 5/2003 | Koenig | |
| 2006/0056206 A1* | 3/2006 | Kifuku | H02M 7/5387 363/15 |
| 2006/0152085 A1 | 7/2006 | Flett et al. | |
| 2009/0295229 A1 | 12/2009 | Harke | |
| 2011/0127837 A1 | 6/2011 | Sato et al. | |
| 2014/0021789 A1 | 1/2014 | Greer et al. | |
| 2015/0022003 A1 | 1/2015 | Dighrasker et al. | |
| 2015/0084423 A1 | 3/2015 | Gamborg | |
| 2015/0145328 A1* | 5/2015 | Ohshima | H02J 3/32 307/29 |
| 2018/0026550 A1 | 1/2018 | Dent | |
| 2019/0149068 A1 | 5/2019 | Sawamura et al. | |
| 2021/0265857 A1* | 8/2021 | Nishimura | H02J 9/06 |

* cited by examiner

*Primary Examiner* — Daniel Cavallari
*Assistant Examiner* — Terrence R Willoughby
(74) *Attorney, Agent, or Firm* — Lando & Anastasi, LLP

(57) ABSTRACT

Systems, methods, and computer-readable mediums include detecting and eliminating a three-phase without neutral short-circuit in a load supplied by a power converter. After detecting the short circuit, the current at an output conductor for one of the three-phases is stopped and then resumed after a sufficient amount of current causes a downstream protection device of the faulty load to trip.

29 Claims, 5 Drawing Sheets

SHORT-CIRCUIT CURRENT CAPACITY ENHANCEMENT

CROSS-REFERENCE TO RELATED APPLICATIONS

This application claims priority under 35 U.S.C. § 120 as a continuation of U.S. application Ser. No. 16/780,513, titled "SHORT-CIRCUIT CURRENT CAPACITY ENHANCEMENT," filed on Feb. 3, 2020, which is hereby incorporated by reference in its entirety.

BACKGROUND

Field

Embodiments of the invention relate generally to detecting a short-circuit downstream from a power converter.

Discussion of Related Art

The use of power devices, such as uninterruptible power supplies (UPS), to provide regulated, uninterrupted power for sensitive and/or critical loads, such as computer systems and other data processing systems, is known. One or more UPSs can be included in an uninterruptible power system in a stand-alone, parallel, or other configuration. Known uninterruptible power supplies include on-line UPSs, off-line UPSs, line interactive UPSs, as well as others. On-line UPSs provide conditioned AC power as well as back-up AC power upon interruption of a primary source of AC power. Off-line UPSs typically do not provide conditioning of input AC power, but do provide back-up AC power upon interruption of the primary AC power source. Line interactive UPSs are similar to off-line UPSs in that they switch to battery power when a blackout occurs but also typically include a multi-tap transformer for regulating the output voltage provided by the UPS.

Three-phase power systems receive single-phase or three-phase input power from a single-phase or three-phase power source and provide regulated three-phase output power to a load, with or without neutral. More specifically, a three-phase power system includes three input lines, each input line configured to received one phase of the three-phase input power, power conversion circuitry configured to generate regulated three-phase output power derived from the input single-phase or three-phase power, and three output lines, each output line configured to carry one phase of three-phase output power. The power conversion circuitry of the three-phase power system can be a UPS system that provides regulated and uninterrupted three-phase output power.

SUMMARY

At least one aspect of the invention is directed to a power converter system, comprising an input configured to be coupled to a power source and to receive single-phase or three-phase input power from the power source, power conversion circuitry coupled to the input and configured to convert the input power into three-phase output power, a first conductor coupled to the power conversion circuitry and configured to carry a first phase of the three-phase output power, a second conductor coupled to the power conversion circuitry and configured to carry a second phase of the three-phase output power, a third conductor coupled to the power conversion circuitry and configured to carry a third phase of the three-phase output power, an output coupled to the first conductor, the second conductor, and the third conductor, and configured to be coupled to a load and to provide the three-phase output power to the load, and a controller configured to: detect a first voltage on the first conductor, detect a second voltage on the second conductor, detect a third voltage on the third conductor, determine if the first voltage, the second voltage, and the third voltage are within a tolerance, and in response to determining that the first voltage, the second voltage, and the third voltage are within the tolerance, operate the power conversion circuitry to provide two-phase output power to the output.

According to one embodiment, the controller is further configured to resume providing the three-phase output power to the output, via the first conductor, the second conductor, and the third conductor, in response to determining that voltages on the two of the first conductor, the second conductor, and the third conductor are not within the tolerance.

According to another embodiment, the power converter system further comprises a circuit breaker configured to be coupled between the output and the load, wherein the two-phase output power has a first rms current value at a level sufficient to trip the circuit breaker in response to a short circuit condition at the load. The three-phase output power has a second rms current value at a level less than the level of the first rms current value According to one embodiment, the tolerance is one of: zero volts, one volt, two volts, three volts, four volts, and five volts.

According to another embodiment, the power conversion circuitry is operated to provide the two-phase output power to the output via two conductors selected from the group consisting of the first conductor, the second conductor, and the third conductor.

According to one embodiment, the power conversion circuitry includes an inverter within an uninterruptible power supply (UPS).

According to another embodiment, the output is configured to be coupled to a plurality of loads and the output is configured to provide the three-phase output power to the plurality of loads.

According to one embodiment, the power source is a three-phase power source with or without neutral.

According to another embodiment, the three-phase output power provided to the load is three-phase power with or without neutral.

At least one aspect of the invention is directed to a non-transitory computer-readable medium storing thereon sequences of computer-executable instructions for controlling a power converter system comprising an input configured to be coupled to a power source and to receive single-phase or three-phase input power from the power source, power conversion circuitry coupled to the input and configured to convert the input power into three-phase output power, a first conductor coupled to the power conversion circuitry and configured to carry a first phase of the three-phase output power, a second conductor coupled to the power conversion circuitry and configured to carry a second phase of the three-phase output power, a third conductor coupled to the power conversion circuitry and configured to carry a third phase of the three-phase output power, an output coupled to the first conductor, the second conductor, and the third conductor, and configured to be coupled to a load and to provide the three-phase output power to the load, and a controller, the sequences of computer-executable instructions that instruct the controller to detect a first voltage of the first conductor, detect a second voltage of the second conductor, detect a third voltage of third conductor, determine if the first voltage, the second voltage, and the third voltage are within a tolerance, and in response to determining that the first voltage, the second voltage, and the third voltage are within the tolerance, operate the power conversion circuitry to provide two-phase output power to the output.

According to one embodiment, the sequences of computer-executable instructions instruct the controller to resume providing the three-phase output power to the output, via the first conductor, the second conductor, and the third conductor, in response to determining that voltages on the two of the first conductor, the second conductor, and the third conductor are not within the tolerance.

According to another embodiment, providing the two-phase output power includes providing two-phase output power with a first rms value at a level sufficient to trip a circuit breaker coupled between the output and the load. Providing the three-phase output power to the output includes providing the three-phase output power with a second rms current value that is less than the first rms current value.

According to one embodiment, the tolerance is one of: zero volts, one volt, two volts, three volts, four volts, and five volts.

According to another embodiment, the power conversion circuitry is operated to provide the two-phase output power to the output via two conductors selected from the group consisting of the first conductor, the second conductor, and the third conductor.

According to one embodiment, the power conversion circuitry includes an inverter within an uninterruptible power supply (UPS).

According to another embodiment, providing the three-phase output power includes providing the three-phase output power to a plurality of loads.

According to one embodiment, the power source is a three-phase power source with or without neutral.

According to another embodiment, the three-phase output power provided to the load is three-phase power with or without neutral.

DETAILED DESCRIPTION

Figure 1:
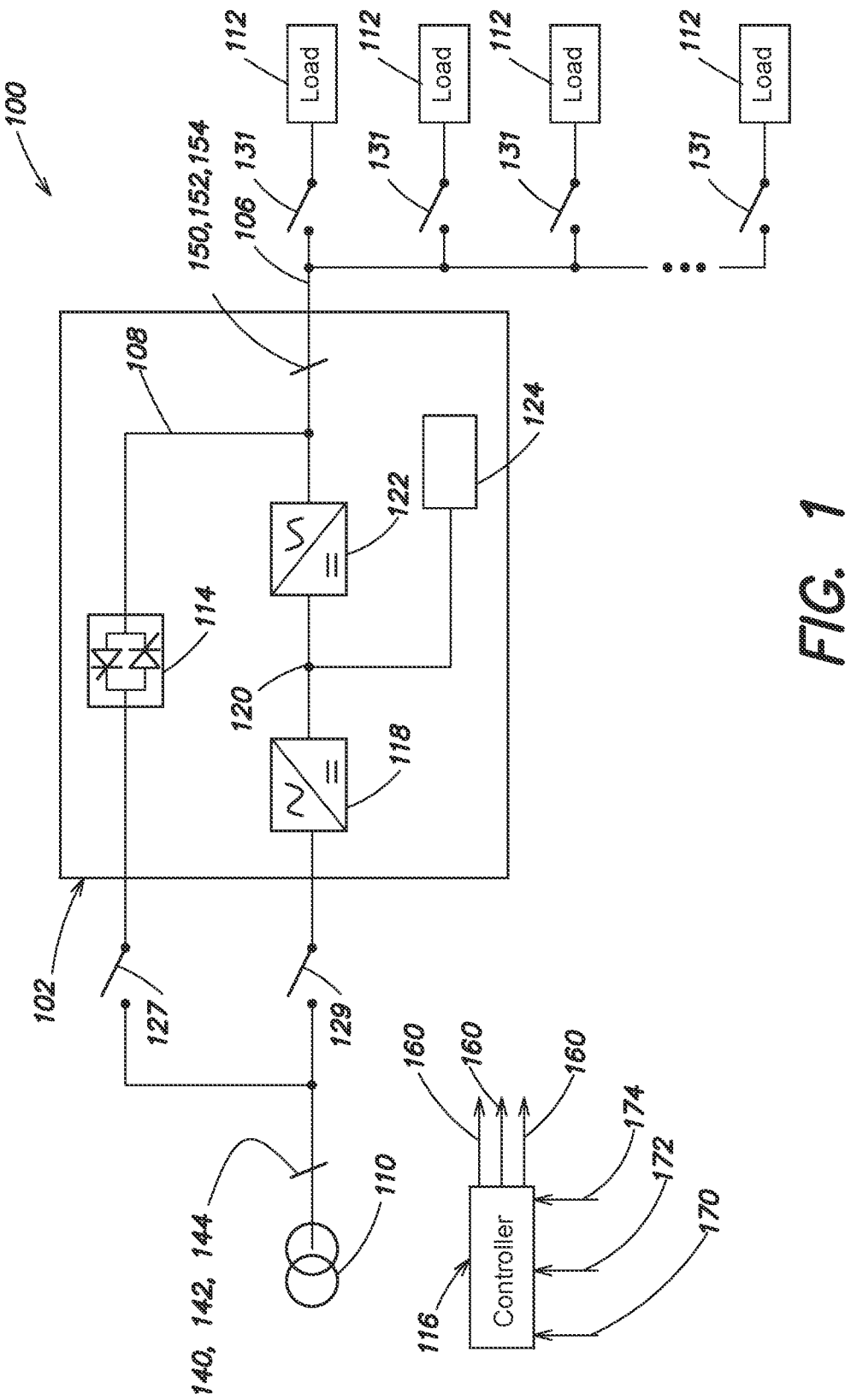
FIG. 1 is a block diagram of an example power system including a UPS, according to aspects described herein.

It is to be appreciated that embodiments of the methods, apparatuses, and computer readable mediums discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. References to "or" may be construed as inclusive so that any terms described using "or" may indicate any of a single, more than one, and all of the described terms.

In a three-phase power system, different short circuit conditions can exist on the output side of the system. In a line (i.e., single phase) to earth short circuit, the short circuit current (Ik1) is between one output phase line to earth ground or to neutral when the neutral is grounded. In a short circuit between two-phases, the short circuit current (Ik2) is between one output phase line to another output phase line. In a three-phase short-circuit, the short circuit current (Ik3) is between all three output phase lines.

When a UPS in a three-phase power system that is providing power to one or more loads faces a three-phase short circuit without neutral at its output, the faulty load causing the short circuit will offer a significantly low impedance compared to the other correctly operating loads and will absorb a majority of the output current supplied by the UPS. In addition, while the current to the faulty load will increase, the voltage across the faulty load will decrease. As a result, the power conversion circuitry of the UPS may supply its maximum possible current to the output to try and re-establish the nominal voltage across the faulty load. Such operation at the maximum current may damage the load, UPS, or other components in the system.

In some UPS systems, the supplied output current is intentionally limited during a short circuit condition to protect components of the UPS. However, when the supplied output current is limited during a three-phase short circuit without neutral, a downstream protection device (e.g. a circuit-breaker or fuse) protecting the faulty load may not receive sufficient current to open or trip in response to the short circuit condition as the limited output current is split between all three-phase lines. If the short-circuit continues for a prolonged period of time without being isolated from the system by the downstream protection device (e.g., because the supplied current is not sufficient to trip the downstream protection device), the faulty load and other components of the system could be damaged. In some power conversion systems, this situation can result in the design of downstream protection devices having sufficiently low tripping values such that they are configured to trip during a three-phase short circuit without neutral, even when the current is limited. In some installations, such relatively low tripping values are undesirable as it can decrease an overall power rating of the system.

Aspects and embodiments described herein are generally directed to systems, methods, and computer-readable mediums for detecting and eliminating a three-phase without neutral short-circuit in a system providing three-phase power. The embodiments described herein operate to cause an increase in output current during a three-phase short circuit without neutral such that the output current supplied by the UPS is sufficient to trip the downstream protection device protecting the faulty load.

FIG. 1 is a block diagram of an example power system 100, according to certain aspects and embodiments described herein. The power system 100 includes a UPS 102, an input 104, an output 106, a bypass circuit 108, a bypass switch 114, a controller 116, an AC/DC converter 118, a DC bus 120, and a DC/AC converter 122, a DC/DC converter 124, an upstream protection device 127, an upstream protection device 129, a plurality of downstream protection devices 131, one or more control lines 160, a first controller input line 170, a second controller input line 172, and a third controller input line 174. In at least one embodiment, the input 104 includes a first power input line 140, a second power input line 142, and a third power input line 144. In at least one embodiment, the output 106 includes a first output conductor 150, a second output conductor 152, and a third output conductor 154.

The input 104 is configured to be coupled to a power source 110 and to receive single-phase or three-phase input power from the power source 110. As shown in FIG. 1, the input 104 includes three separate power input lines 140,142, 144, each configured to conduct one phase of the input power. Where the input power is three-phase input power, a first phase P1 of the three-phase input power is conducted by a first power input line 140, a second phase P2 is conducted by a second power input line 142, and a third phase P3 is conducted by a third power input line 144.

The input 104 is coupled to upstream protection device 127 and upstream protection device 129. Upstream protection device 127 is coupled to bypass switch 114 and upstream protection device 129 is coupled to AC/DC converter 118. While system 100 is shown as having two upstream protection devices 127,129, input 104 may instead be coupled to a single upstream protection device that is coupled to both bypass switch 114 and AC/DC converter 118. Upstream protection devices 127,129 may be located internally or externally to UPS 102.

The input of AC/DC converter 118 is coupled to upstream protection device 129. The output of the AC/DC converter 118 and the input of the DC/AC converter 122 is coupled to DC bus 120. The DC/DC converter 124 is coupled to DC bus 120. In at least one embodiment, the DC/DC converter 124 is configured to be coupled to backup DC power source (e.g., a battery). The DC/AC converter 122 is coupled to output 106, which is also coupled to bypass switch 114. The input of bypass switch 114 is coupled to upstream protection device 127. The output of bypass switch 114 is coupled to the output of DC/AC converter 122 via bypass circuit 108.

The output 106 of UPS 102 includes three output conductors 150, 152,154, each configured to conduct one of three-phases of output power. Each conductor 150,152,154 is coupled to bypass circuit 108 and the output of DC/AC converter 122. The output 106 is coupled to one or more loads 112 and configured to provide output three-phase power, conditioned by the UPS 102, to the one or more loads 112 based at least in part on the input power.

In one embodiment of system 100, the output 106 is wired for loads 112 without neutral. In another embodiment of system 100 the output 106 is wired for loads 112 with neutral.

Each load 112 is connected to output 106 via the three conductors 150,152,154. As illustrated in FIG. 1, each load 112 is coupled in parallel to output 106. Each load 112 is coupled to the output 106 via a respective downstream protection device 131. While shown by example in FIG. 1 as having a plurality of loads 112, the output 106 of UPS 102 may be coupled to a single load 112 or any number of loads. In another example, each load 112 is coupled to one or more additional loads in series or parallel thereby forming a group of loads such that the group of loads is connected to a downstream protection device 131. The term "load" includes any device or group of devices or product or group of products requiring to be supplied for its/their operation.

In certain examples, controller 116 may be located within UPS 102 or located externally to UPS 102 and communicate with UPS 102 either locally or remotely. While shown by example in FIG. 1 as having a plurality of controller input lines 170,172,174 and one or more control lines 160, system 100 may include one or any number of controller input lines or control lines. The controller 116 can be coupled to different components of the system and/or UPS 102 via control line 160.

The first controller input line 170 is coupled to the first output conductor 150 and is configured to carry a first signal from the first output conductor 150 to the controller 116. The second controller input line 172 is coupled to the second output conductor 152 and is configured to carry a second signal from the second output conductor 152 to the controller 116. The third controller input line 174 is coupled to the third output conductor 154 and is configured to carry a third signal from the third output conductor 154 to the controller 116.

Each signal carried by the controller input lines 170,172, 174 is at a level indicative of a current and/or voltage value for a respective phase of power (i.e., for a respective output conductor 150, 152, 154). In various embodiments, each voltage value is considered as being referenced to the neutral or a potential of the neutral.

In an example system 100 supplying three-phase output power, the first output conductor 150 conducts a first phase P1 of the three-phase output power, a second output conductor 152 conducts a second phase P2 of the three-phase output power, and a third output conductor 154 conducts a third phase P3 of the three-phase output power.

As illustrated in FIG. 1, the UPS 102 is configured to provide output power to a plurality of loads 112. More specifically, input AC power from the power source 110 is provided to the UPS 102 via the input 104. The controller 116 monitors the input AC power and operates the UPS 102 in different modes based on the status of the input AC power. For example, in response to the input AC power being such that it does not need to be regulated and can adequately power the loads 112, the controller operates the UPS 102 in a bypass mode of operation. In the bypass mode of operation, the input AC power is provided directly to the output, via the bypass circuit 108. In response to the input AC power being such that it can adequately power the loads 112 after being conditioned, the controller 116 operates the UPS 102 in an online mode of operation. In the online mode of operation, the AC/DC converter 118 converts the input AC power into DC power. The converted DC power is provided to the DC/AC converter 122 via the DC bus 120. The DC/AC converter converts the DC power from the DC bus 120 into output AC power. The output AC power is provided to the plurality of loads 112. When the input AC power is insufficient to power the loads 112, the controller 116 operates the UPS 102 in a backup mode of operation. In the backup mode of operation, backup DC power is provided to the DC/DC converter 124 from a battery. The DC/DC converter 124 regulates the DC power from the battery and provides regulated DC power to the DC bus 120. The DC/AC converter converts the DC power from the DC bus 120 into output AC power. The output AC power is provided to the plurality of loads 112.

In one example of system 100, as the system 100 provides regulated power to the loads 112, control logic within controller 116 receives the first signal from the first output conductor 150 via the first controller input line 170, the second signal from the second output conductor 152 via the second controller input line 172, and the third signal from the third output conductor 154 via the third controller input line 174. The first signal represents a value of current and/or a value of voltage for phase P1 (i.e., on the first output conductor 150). The second signal represents a value of current and/or a value of voltage for phase P2 (i.e., on the second output conductor 152). The third signal represents a value of current and/or a value of voltage for phase P3 (i.e., on the third output conductor 154). In response to receiving the value of current and/or value of voltage from each of the first signal, the second signal, and the third signal, control logic within controller 116 determines whether a three-phase without neutral short circuit has occurred.

As discussed in greater detail below, the controller 116 determines that a three-phase short circuit without neutral is present on one of the loads 112 in response to identifying that the voltage level on each output conductor 150, 152, 154 is substantially the same and in response to identifying that the voltage level on each output conductor 150, 152, 154 is different from zero, a floating point, or the neutral's potential as the reference for voltage measurements.

In response to determining that a three-phase without neutral short circuit has occurred, the controller 116 sends one or more control signals via one or more of the control lines 160 to one or more components of system 100 in order to stop conduction on one of the output conductors 150, 152, 154. After conduction has stopped, control logic within the controller 116 can send a signal via the control lines 160 to resume conduction of the conductor that was previously stopped upon identifying that the three-phase short circuit without neutral condition has been cleared.

For example, in at least one embodiment, in response to identifying a three-phase short circuit without neutral, the controller 116 sends a signal along one or more control lines 160 to the DC/AC converter 122 to operate the converter 122 to switch from providing three-phase output power on the three output conductors 150, 152, 154 to providing two-phase output power on two of the output conductors 150,152,154. While providing two-phase output power, in response to identifying that the three-phase short circuit without neutral has been cleared, the controller 116 sends a signal to DC/AC converter 122 to switch from providing two-phase output power to providing three-phase output power.

In another example, in response to identifying a three-phase short circuit without neutral, the controller 116 sends a signal along one or more control lines 160 to a switch in the system 100 (e.g., a switch coupled to an output conductor 150, 152, 154) to operate the switch to open, thereby preventing current in one of the output conductors 150, 152, 154 such that two-phase output power is provided to the loads 112 rather than three-phase output power. While providing two-phase output power, in response to identifying that the three-phase short circuit without neutral has been cleared, the controller 116 sends a signal to the switch to close such that three-phase output power is again provided to the loads 112.

Figure 2:
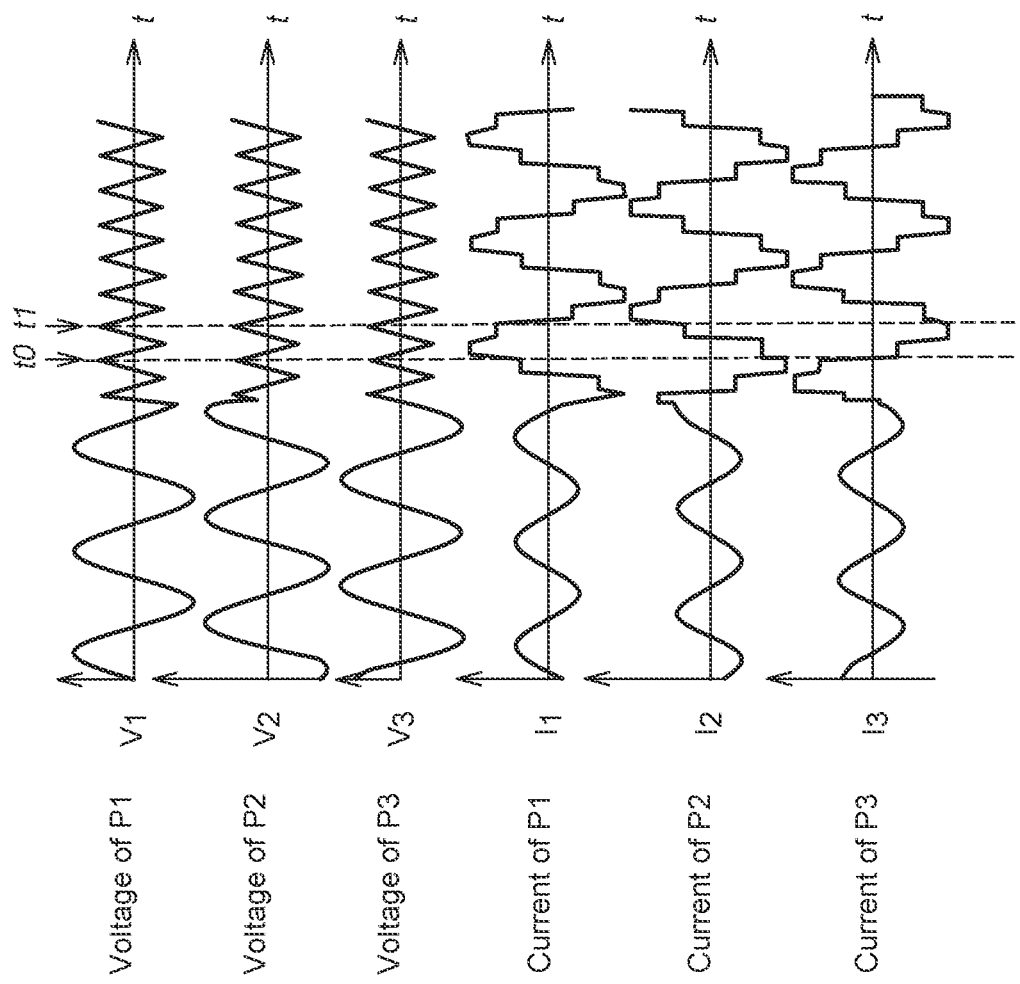
FIG. 2 is an illustration of waveforms of voltage and current during a three-phase without neutral short-circuit event, according to aspects described herein.

FIG. 2 is an illustration of voltage and current waveforms before, during, and after a three-phase without neutral short-circuit, without utilizing any technique for eliminating a short circuit disclosed herein. In this short-circuit, a current I1 passes through a first output conductor 150 that conducts phase P1, a current I2 passes through a second output conductor 152 that conducts phase P2, and a current I3 passes through a third output conductor 154 that conducts phase P3.

FIG. 2 includes: a graph of the voltage V1 across P1 over a period of time, a graph of the voltage V2 across P2 over the same period of time, a graph of the voltage V3 across P3 over the same period of time, a graph of the current I1 of P1 over the same period of time, a graph of the current I2 of P2 over the same period of time, and a graph of the current I3 of P3 over the same period of time. Values of voltage or current above the horizontal axis of each graph correspond to positive values of voltage or current, and likewise, values below each graph correspond to negative values of voltage or current. Each graph of voltage is illustrated at the same scale and likewise, each graph of current is illustrated at the same scale. The horizontal axis represents time, which moves forward from left to right in each graph.

As shown in FIG. 2, just before time t0, a three-phase short-circuit event begins. Between time t0 and t1, the voltages V1,V2,V3 are substantially the same and different from a value of zero or near zero, indicating the existence of the three-phase short circuit without neutral being involved in the short-circuit. During the period between time t0 and the time t1, the sum of the three currents I1,I2,I3 is equal to zero or substantially near zero as in a three-phase without neutral short-circuit, a current path is formed between all three phases P1,P2,P3 (i.e., between the output conductors). Such a short-circuit may be faced in any installation supplied by a three-phase UPS, such as UPS 102, or similar electronic power converter. A higher risk of occurrence of such a short-circuit can occur when the installation is wired without neutral and no bypass mains are available.

Figure 3:
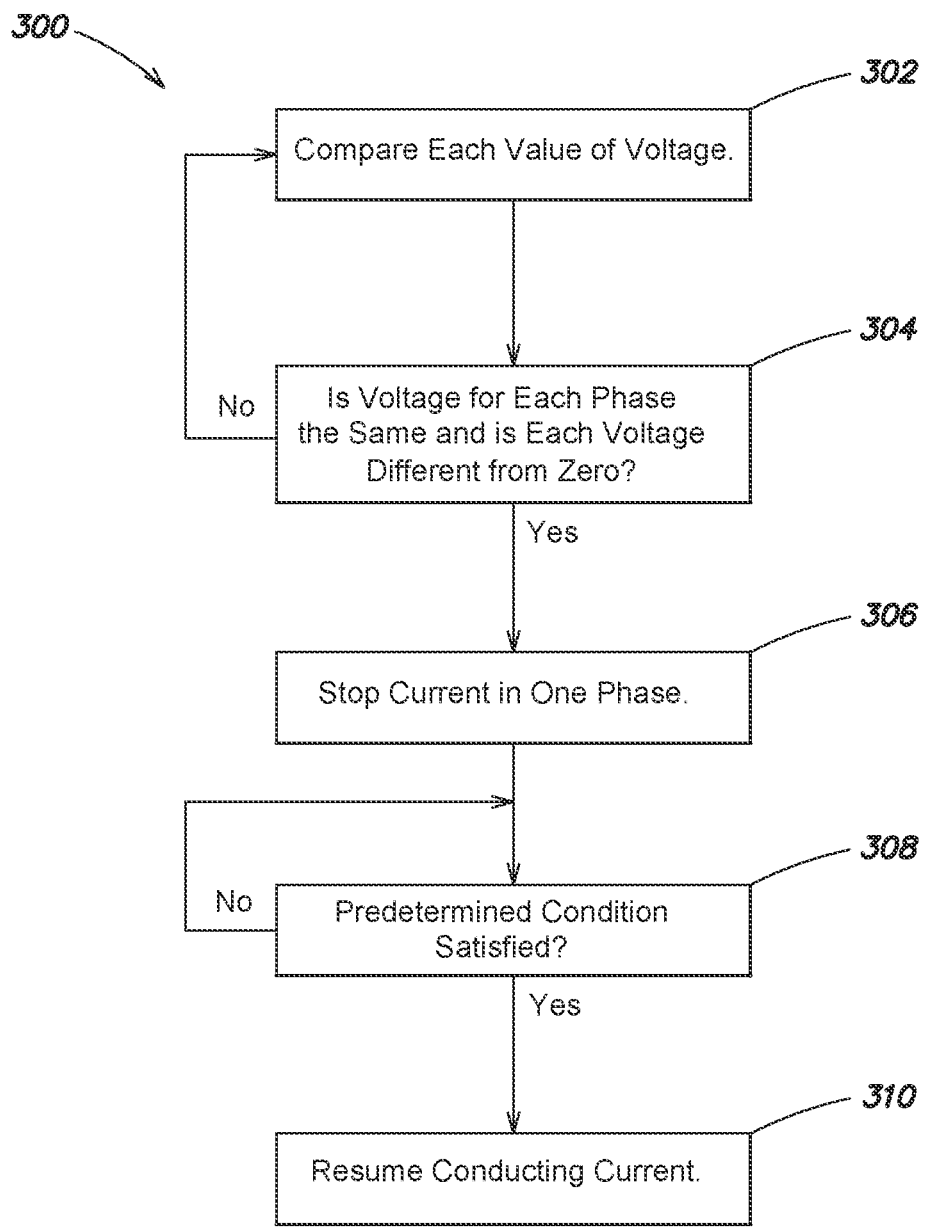
FIG. 3 is a flowchart of a method for detecting and eliminating a three-phase without neutral short-circuit event utilizing embodiments described herein.

FIG. 3 discloses a method 300 for identifying and removing such a three-phase short circuit without neutral condition. Method 300 includes steps 302, 304, 306, 308, 310. The steps are described below with respect to the system 100 shown in FIG. 1.

In step 302 while the system 100 is providing output power to the loads 112, the voltage at each output conductor 150,152,154 is compared with each other at each time instance t to determine if each voltage is the same, substantially the same, or within a predetermined tolerance of one another. For example, in at least one embodiment the tolerance is one or more volts, such as one, two, three, four, or five volts. In one embodiment, voltage V1 at output conductor 150 is compared to voltage V2 at output conductor 152 and voltage V3 at output conductor 154. In one example, when each voltage V1, V2, V3 is within a tolerance of each other voltage, then all three of the voltages are determined to be substantially the same. In another example, the tolerance is one volt, and when each voltage is compared to each other voltage resulting in a determination that every voltage has a value within one volt of every other voltage, then the three voltages are determined to be substantially the same. In another embodiment, V1 is compared with V2, V2 is compared with V3, and V1 is compared with V3. In one embodiment, each comparison of two of V1,V2,V3 is made with the same tolerance. In another embodiment, each comparison of two of V1,V2,V3 is made with a different tolerance. In an example, voltages V1,V2 are compared to a first tolerance and voltages V2,V3 are compared to a second tolerance, where the first tolerance is different from the second tolerance.

In one embodiment, in addition to comparing each value of voltage in step 302, the detected observation that one or two of the currents I1,I2,I3 has reached its maximum value or near its maximum value within a predetermined tolerance (instantaneous current limitation) can be used to indicate or confirm the voltages V1,V2,V3 are all about the same voltage. In one embodiment, in step 302, a value of V1 is received by controller 116 from a signal received on a first controller input line 170, a value of V2 is received by controller 116 from a signal received on a second controller input line 172, and a value of V3 is received by controller 116 from a signal received on a third controller input line 174. The voltages V1,V2,V3 are then compared as described above.

In step 304, if the result of the comparisons in step 302 indicates that voltages V1,V2,V3 are the same, substantially the same, or within a specified tolerance, then step 304 determines if each voltage V1,V2,V3 is different from a value of zero or near zero. If each voltage V1,V2,V3 is different than the value of zero or near zero, then method 300 proceeds to step 306. In one example, each voltage V1,V2, V3 being outside the range of negative one volt to positive one volt indicates in step 304 that each voltage is different from the value of zero or near zero. If the result of the comparisons in step 302 indicates that voltages V1,V2,V3 are not the same, not substantially the same, not within a specified tolerance, or are substantially equal to zero at the same time t, then method 300 returns to step 302 and repeats step 302. In at least one embodiment, steps 302 and 304 are periodically repeated for a predetermined period of time t, including each time that each voltage V1, V2, V3 crosses a value of zero voltage or a value of neutral voltage. For example, the decision ("NO" in step 304) to repeat steps 302 and 304 is made continuously, every fraction of one millisecond, or every few milliseconds, returning to step 302 for each negative outcome (indicated by "NO" in FIG. 3) of step 304, until a positive outcome (indicated by "YES" in FIG. 3) occurs. In an example, when steps 302 and 304 are made continuously, the processing of steps 302 and 304 is carried out by special-purpose hardware. A positive outcome in step 304 indicates that there is a three-phase short-circuit occurring without the neutral being involved. In another embodiment, step 304 determines if the voltage for each phase P1,P2,P3 is the same and each voltage is different from the potential of the neutral.

In step 306, if the result of the determination in step 304 is positive (indicated by "YES" in FIG. 3), then current is stopped in one of the three-phases P1,P2,P3. Any one of the three-phases can be stopped in step 306. In one example, the selected current of I1,I2,I3 that is stopped is predetermined or chosen at random. When current is stopped in one of the three-phases P1,P2,P3, the voltage on each of the three-phases remains about the same for a period of time.

For example, in one embodiment, after step 304 indicates there is a three-phase without neutral short circuit, in step 306, controller 116 sends one or more control signals along one or more control lines 160 to the DC/AC converter 122 in order to operate the DC/AC converter 122 to switch from providing three-phase output power on the three output conductors 150, 152, 154 to providing two-phase output power on two of the output conductors 150,152,154. In another embodiment, the controller 116 sends one or more control signals alone one or more control lines 160 to a switch in the system 100 (e.g., a switch coupled to an output conductor 150, 152, 154) to operate the switch to open, thereby preventing current in one of the output conductors 150, 152, 154 such that two-phase output power is provided to the loads 112 rather than three-phase output power.

Once two-phase power is provided to the loads 112, rather than three-phase output power, the three-phase short-circuit condition is changed to a two-phase short circuit condition between the two remaining active phases. By preventing current in one of the output conductors and changing the short condition from a three-phase condition to a two-phase condition, the number of conduction paths at the output of the UPS 102 is reduced from three to two, thereby increasing the RMS of the output current supplied by UPS 102. A majority of the increased output current supplied by the UPS is provided to the faulty load exhibiting the short circuit and as a result, the increased output current provided to the faulty load will trip the downstream protection device 131 corresponding to the faulty load. Once the faulty load is removed from the system by the downstream protection device 131, the system 100 can once again be operated as three-phase system (i.e., the previously de-energized phase can be reactivated).

For example, in step 308, while providing two-phase output power, a determination is made by the controller 116 whether a condition has been met that indicates that the three-phase short circuit without neutral condition has been cleared (i.e., the faulty load has been removed from the system via the corresponding protection device). In one example, the controller 116 identifies that the three-phase short circuit without neutral condition has been cleared in response to a determination that the voltage across the output conductor that was previously instructed to stop conducting current has gone to zero volts or substantially zero volts. For example, if the current I3 on P3 was previously stopped, then a voltage V3 across P3 of zero volts or substantially zero volts can signify to the controller 116 that the short circuit has cleared. In another embodiment, the controller 116 identifies that the three-phase short circuit without neutral condition has been cleared in response to a determination that the voltages across the two-phases that continued to conduct current are no longer the same, substantially the same, or within a predetermined tolerance. For example, if the current I3 on P3 was previously stopped, then the voltages V1,V2 would be compared to determine if they were the same or substantially the same within a tolerance of a few volts. If the voltages V1,V2 are not the same, substantially the same, or within a predefined tolerance, the controller 116 identifies that the three-phase short circuit without neutral condition has been cleared. In one embodiment, the condition in step 308 includes determining both that the voltage across the output conductor that was stopped is substantially zero and also determining the voltages on the other two phases are sufficiently different from one another within a tolerance. In an example, the tolerance is one volt.

According to at least one embodiment, the controller 116 identifies that the three-phase short circuit without neutral has been cleared in response to both a determination that the voltage determination that the voltage across the output conductor that was previously instructed to stop conducting current has gone to zero volts or substantially zero volts and that the voltages across the two-phases that continued to conduct current are no longer the same, substantially the same, or within a predetermined tolerance.

If the result of the determination in step 308 is positive (indicated by "YES" in FIG. 3), then method 300 proceeds to step 310. If the result of the determination in step 308 is negative (indicated by "NO" in FIG. 3), then method 300 repeats step 308. In one embodiment, step 308 includes a predetermined waiting period. In an example, a few milliseconds pass before the determination in step 308 is made. In another embodiment, step 308 repeats at a predetermined interval of time until a positive indication is made.

In step 310, when the outcome of step 308 is positive, indicating the short circuit is no longer present in the system, current is resumed or re-energized on the phase/conductor where current was stopped. For example, if the current I3 in P3 was stopped or interrupted in step 306, then in step 310, current at a third conductor in UPS 102 is controlled to resume conducting for P3.

In one embodiment, in step 310, the switch that was instructed to open or cease conducting in step 306 is closed and re-energized, conducting its respective nominal phase. The switch closes in response to a control signal from controller 116 sent along one or more control lines 160.

In another embodiment, in step 310, the DC/AC converter 122 of UPS 102 is instructed to switch from providing two-phase output power to three-phase output power in response to receiving a control signal from controller 116 sent along one or more control lines 160.

In one embodiment, each step of method 300 is performed by a controller, such as controller 116. The controller 116 executes software in order to perform all or part of method 300. In another embodiment, method 300 is implemented as a logic flow of the firmware of UPS 102. In one embodiment, method 300 is implemented entirely with special-purpose hardware.

Figure 4:
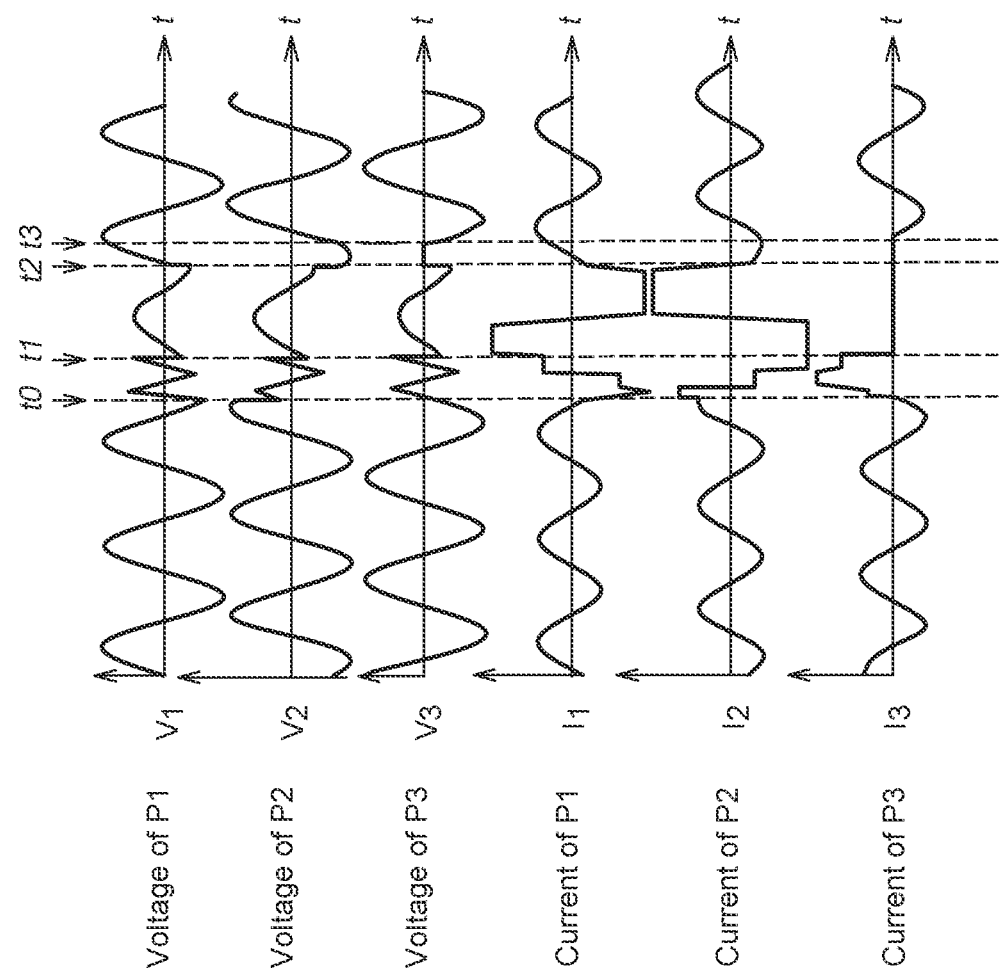
FIG. 4 is an illustration of waveforms of voltage and current during a three-phase without neutral short-circuit utilizing embodiments described herein.

FIG. 4 is an illustration of waveforms of voltage and current before, during, and after a three-phase without neutral short-circuit, utilizing one or more embodiments of the invention to eliminate the three-phase without neutral short circuit. For the sake of brevity, only differences between FIG. 4 and FIG. 2 will be further described.

The times t0 and t1 shown in FIG. 4 signify the same events as t0 and t1 in FIG. 2. FIG. 4 differs from FIG. 2 by showing one advantage of the various embodiments disclosed herein. Steps 302 and 304 of method 300 occur during the time before t0 up to the time t1. In step 304, during the period of time t0 up to t1, a positive determination is made that a three-phase short circuit without neutral is occurring in the three-phases P1,P2,P3. In step 306, at time t1, current conducting in one of the output conductors of one of the three-phases P1,P2,P3 is stopped, as described above. As an example, this is shown in FIG. 4 as the current in P3 being stopped at time t1. In another example, any one of the currents conducting at the three conductors is stopped.

During the period t1 to t2, only the two remaining active output conductors continue to conduct current while each of the three voltages continue on each of the three conductors. As similarly described above, by preventing current in one of the output conductors and changing the short condition from a three-phase condition to a two-phase condition, the number of conduction paths at the output of the UPS 102 is reduced from three to two, thereby increasing the RMS of the output current supplied by UPS 102. A majority of the increased output current supplied by the UPS is provided to the faulty load exhibiting the short circuit and as a result, the increased output current provided to the faulty load will trip the downstream protection device 131 corresponding to the faulty load. Once the faulty load is removed from the system by the downstream protection device 131, the system 100 can once again be operated as three-phase system (i.e., the previously de-energized phase can be reactivated).

As shown in FIG. 4 in step 308, at any point at or after time t2, a determination is made whether the voltage on P3 is near zero or zero, and/or if the voltages V1,V2 on P1 and P2 are no longer the same (i.e., indicating that the three-phase short circuit condition has been removed). In response to determining that the voltage on P3 is near zero or zero and/or if the voltages V1,V2 on P1 and P2 are no longer the same or about the same, the previously deactivated phase P3 can be reactivated to provide three-phase power to the remaining loads 112.

As shown in FIG. 4, between times t2 and t3, the voltage on P3 is near zero or zero and the voltages V1,V2 on P1 and P2 are no longer the same, indicating that the short circuit has been cleared and that normal three-phase operation can resume. It is noted that the graph of the voltage V3 of P3 in FIG. 4 shows the voltage during the period between times t2 and t3 as being equal zero. The phrase "equal to zero" as used herein is understood to mean "approximately zero" as the voltage V3 of P3 in FIG. 4 is equal to zero in a theoretical system. However, in real-world practice, this value may be equal to a non-zero value. Likewise, the fine-tuned value of what signifies zero volts is defined during the UPS design. A condition of zero volts is still checked, however, if desired.

Method 300 detects a three-phase short circuit without neutral occurring in a system by recognizing a distinct behavior in the voltage values of the three-phases that indicates the occurrence of the short circuit, and eliminates the short-circuit by stopping current conducting on an output conductor that conducts output power one of the phases, and then resuming the conduction of current when one or more conditions are satisfied that confirm the short circuit has been eliminated. The short-circuited load is eliminated from the system by changing the system from a three-phase output power system to a two-phase output power system by de-energizing one phase of the system. Stopping the conduction of current for one of the phases causes an increase in the RMS value of the output current of the system. The faulty load offers a relatively low impedance that absorbs the largest part of the increased output current, thereby increasing the current conducting at a downstream protection device for the faulty load, which causes the downstream protection device to trip or open, thereby safeguarding the system from damage resulting from the short circuit.

Figure 5:
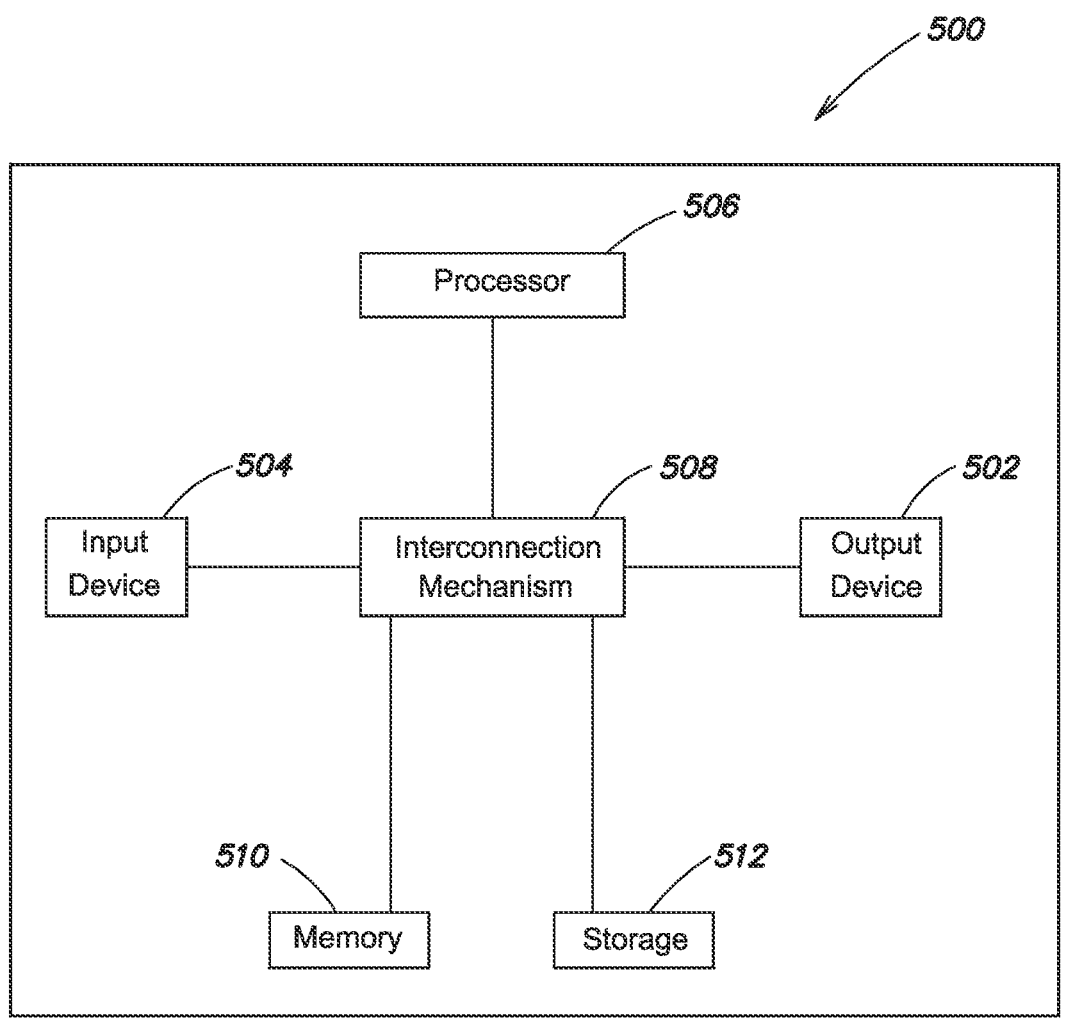
FIG. 5 is an example system utilizing one or more embodiments described herein.

FIG. 5 illustrates an example block diagram of computing components forming a system 500 which is configured to implement one or more aspects disclosed herein. For example, the system 500 is communicatively coupled to the controller 116, included within the controller 116, or included within a UPS dedicated controller. In another example, the system 500 is configured operate multiple UPSs like UPS 102 and detect a three-phase without neutral short circuit on one or more of the UPSs.

In one example, the system 500 includes a computing platform such as those based on Intel PENTIUM-type processor, Motorola PowerPC, Sun UltraSPARC, Texas Instruments-DSP, Hewlett-Packard PA-RISC processors, or any other type of processor. In one example, system 500 includes specially-programmed, special-purpose hardware, for example, an application-specific integrated circuit (ASIC). Various aspects herein may be implemented as specialized software executing on the system 500 such as that shown in FIG. 5.

In one example, the system 500 includes a processor 506 connected to one or more memory devices 510, such as a disk drive, memory, flash memory or other device for storing data. In one example, processor 506 is an ASIC. In one example, memory 510 is used for storing programs and data during operation of the system 500. In one example, components of the computer system 500 are coupled by an interconnection mechanism 508, which include one or more buses (e.g., between components that are integrated within a same machine) and/or a network (e.g., between components that reside on separate machines). The interconnection mechanism 508 enables communications (e.g., data, instructions) to be exchanged between components of the system 500. The system 500 also includes one or more input devices 504, which includes for example, a keyboard or a touch screen. The system 500 includes one or more output devices 502, which includes, for example, a display. In addition, for example, the computer system 500 contains one or more interfaces (not shown) that connects the computer system 500 to a communication network, in addition or as an alternative to the interconnection mechanism 508.

In one example, the system 500 includes a storage system 512, which includes a computer readable and/or writeable nonvolatile medium in which signals are stored to provide a program to be executed by the processor or to provide information stored on or in the medium to be processed by the program. The medium, for example, is a disk or flash memory and in some examples includes RAM or other non-volatile memory such as EEPROM. The medium, for example, is a non-transitory computer readable medium storing thereon sequences of computer-executable instructions for controlling a power converter system including a controller, the sequences of computer-executable instructions that instruct the controller to perform any of the methods disclosed herein, including method 300, with any of the systems disclosed herein, including system 100.

In some embodiments, the processor causes data to be read from the nonvolatile medium into another memory 510 that allows for faster access to the information by the processor/ASIC than does the medium. In one example, this memory 510 is a volatile, random access memory such as a dynamic random-access memory (DRAM) or static memory (SRAM). The memory is located in storage system 512 or in memory system 510. In one example, the processor 506 manipulates the data within the integrated circuit memory 510 and then copies the data to the storage 512 after processing is completed. A variety of mechanisms are known for managing data movement between storage 512 and the integrated circuit memory element 510, and the disclosure is not limited thereto. The disclosure is not limited to a particular memory system 510 or a storage system 512.

In one example, the system 500 includes a computer platform that is programmable using a high-level computer programming language. In another example, the system 500 is also implemented using specially programmed, special purpose hardware, e.g. an ASIC. The system 500 includes a processor 506, which in one example, is a commercially available processor such as the well-known Pentium class processor available from the Intel Corporation. Many other processors are available. In one example, the processor 506 executes an operating system which is, for example, a Windows operating system available from the Microsoft Corporation, MAC OS System X available from Apple Computer, the Solaris Operating System available from Sun Microsystems, or UNIX and/or LINUX available from various sources.

In one example, the system 500 includes an entirely hardware-based design operating according to any of the embodiments described herein. In another example, the system 500 includes a combination of hardware and software that operates according to any of the embodiments described herein.

In one example, the processor and operating system together form a computer platform for which application programs in high-level programming languages are written. It should be understood that the disclosure is not limited to a particular computer system platform, processor, operating system, or network. Also, it should be apparent to those skilled in the art that the embodiments herein are not limited to a specific programming language or computer system. Further, it should be appreciated that other appropriate programming languages and other appropriate computer systems could also be used.

The term "UPS" used herein includes a UPS as a stand-alone product, a UPS parallel configuration, or any similar electronic converter or assembly of converters having the ability to supply a load: either directly connected it its output(s), or connected to the supply mains that are fed back in case the main supply would get interrupted or disconnected. As an example, this includes a UPS having some reversibility features, an energy storage system, a photovoltaic product, or a variable speed drive.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A power converter system, comprising:
   an input configured to receive input power from a power source;
   power conversion circuitry coupled to the input and configured to convert the input power into three-phase output power;
   an output configured to provide the three-phase output power to a load; and
   a controller configured to:
   detect a first voltage of a first phase of the three-phase output power,
   detect a second voltage of a second phase of the three-phase output power,
   detect a third voltage of a third phase of the three-phase output power,
   determine if the first voltage, the second voltage, and the third voltage are within a tolerance; and
   in response to determining that the first voltage, the second voltage, and the third voltage are within the tolerance, operate the power conversion circuitry to provide two-phase output power to the output.

2. The power converter system of claim 1, wherein the controller is further configured to resume providing the three-phase output power to the output in response to determining that two voltages of the first voltage, the second voltage, and the third voltage are not within the tolerance.

3. The power converter system of claim 1, further comprising:
   a circuit breaker configured to be coupled between the output and the load,
   wherein the two-phase output power has a first rms current value at a level sufficient to trip the circuit breaker in response to a short circuit condition at the load.

4. The power converter system of claim 3, wherein the three-phase output power has a second rms current value at a level less than the level of the first rms current value.

5. The power converter system of claim 1, further comprising:
- a first conductor coupled to the power conversion circuitry and configured to carry the first phase of the three-phase output power;
- a second conductor coupled to the power conversion circuitry and configured to carry the second phase of the three-phase output power; and
- a third conductor coupled to the power conversion circuitry and configured to carry the third phase of the three-phase output power.

6. The power converter system of claim 5, wherein the power conversion circuitry is operated to provide the two-phase output power to the output via two conductors selected from the group consisting of the first conductor, the second conductor, and the third conductor.

7. The power converter system of claim 1, wherein the power conversion circuitry includes an inverter within an uninterruptible power supply (UPS).

8. The power converter system of claim 1, wherein the output is configured to be coupled to a plurality of loads and the output is configured to provide the three-phase output power to the plurality of loads.

9. The power converter system of claim 1, wherein the power source is a three-phase power source with or without neutral.

10. The power converter system of claim 1, wherein the three-phase output power provided to the load is three-phase power with or without neutral.

11. A non-transitory computer-readable medium storing thereon sequences of computer-executable instructions for controlling a power converter system comprising an input configured to receive input power from a power source, power conversion circuitry coupled to the input and configured to convert the input power into three-phase output power, an output configured to provide the three-phase output power to a load, and a controller, the sequences of computer-executable instructions that instruct the controller to:
- detect a first voltage of a first phase of the three-phase output power;
- detect a second voltage of a second phase of the three-phase output power;
- detect a third voltage of a third phase of the three-phase output power;
- determine if the first voltage, the second voltage, and the third voltage are within a tolerance; and
- in response to determining that the first voltage, the second voltage, and the third voltage are within the tolerance, operate the power conversion circuitry to provide two-phase output power to the output.

12. The computer-readable medium of claim 11, wherein the sequences of computer-executable instructions instruct the controller to:
- resume providing the three-phase output power to the output in response to determining that two voltages of the first voltage, the second voltage, and the third voltage are not within the tolerance.

13. The computer-readable medium of claim 11, wherein providing the two-phase output power includes providing two-phase output power with a first rms value at a level sufficient to trip a circuit breaker coupled between the output and the load.

14. The computer-readable medium of claim 13, wherein providing the three-phase output power to the output includes providing the three-phase output power with a second rms current value that is less than the first rms current value.

15. The computer-readable medium of claim 11, wherein the tolerance is one of: zero volts, one volt, two volts, three volts, four volts, and five volts.

16. The computer-readable medium of claim 11, wherein the power converter system further comprises a first conductor coupled to the power conversion circuitry and configured to carry the first phase of the three-phase output power, a second conductor coupled to the power conversion circuitry and configured to carry the second phase of the three-phase output power, and a third conductor coupled to the power conversion circuitry and configured to carry the third phase of the three-phase output power, and wherein the power conversion circuitry is operated to provide the two-phase output power to the output via two conductors selected from the group consisting of the first conductor, the second conductor, and the third conductor.

17. The computer-readable medium of claim 11, wherein the power conversion circuitry includes an inverter within an uninterruptible power supply (UPS).

18. The computer-readable medium of claim 11, wherein providing the three-phase output power includes providing the three-phase output power to a plurality of loads.

19. The computer-readable medium of claim 11, wherein the power source is a three-phase power source with or without neutral.

20. The computer-readable medium of claim 11, wherein the three-phase output power provided to the load is three-phase power with or without neutral.

21. A method of operating a power converter system including an input configured to receive input power from a power source, power conversion circuitry coupled to the input and configured to convert the input power into three-phase output power, and an output configured to provide the three-phase output power to a load, the method comprising:
- detecting a first voltage of a first phase of the three-phase output power,
- detecting a second voltage of a second phase of the three-phase output power,
- detecting a third voltage of a third phase of the three-phase output power,
- determining if the first voltage, the second voltage, and the third voltage are within a tolerance; and
- in response to determining that the first voltage, the second voltage, and the third voltage are within the tolerance, operating the power conversion circuitry to provide two-phase output power to the output.

22. The method of claim 21, further comprising:
- providing the three-phase output power to the output in response to determining that two voltages of the first voltage, the second voltage, and the third voltage are not within the tolerance.

23. The method of claim 21, wherein the power system further includes a first conductor coupled to the power conversion circuitry, a second conductor coupled to the power conversion circuitry, and a third conductor coupled to the power conversion circuitry, the method further comprising:
- carrying the first phase of the three-phase output power with the first conductor;
- carrying the second phase of the three-phase output power with the second conductor; and
- carrying the third phase of the three-phase output power with the third conductor.

24. The method of claim 21, wherein the method further comprises:
providing the three-phase output power to a plurality of loads via the output.

25. A method of assembling a power converter system, comprising:
providing an input configured to receive input power from a power source;
providing power conversion circuitry configured to convert the input power into three-phase output power;
coupling the power conversion circuitry to the input;
providing an output configured to provide the three-phase output power to a load; and
providing a controller configured to:
detect a first voltage of a first phase of the three-phase output power,
detect a second voltage of a second phase of the three-phase output power,
detect a third voltage of a third phase of the three-phase output power,
determine if the first voltage, the second voltage, and the third voltage are within a tolerance; and
in response to determining that the first voltage, the second voltage, and the third voltage are within the tolerance, operate the power conversion circuitry to provide two-phase output power to the output.

26. The method of claim 25, further comprising:
providing a circuit breaker between the output and the load, wherein the two-phase output power has a first rms current value at a level sufficient to trip the circuit breaker in response to a short circuit condition at the load.

27. The method of claim 26, wherein the three-phase output power has a second rms current value at a level less than the level of the first rms current value.

28. The method of claim 25, further comprising:
coupling a first conductor to the power conversion circuitry, the first conductor configured to carry the first phase of the three-phase output power;
coupling a second conductor to the power conversion circuitry, the second conductor configured to carry the second phase of the three-phase output power; and
coupling a third conductor to the power conversion circuitry, the third conductor configured to carry the third phase of the three-phase output power.

29. The method of claim 25, wherein providing the power conversion circuitry comprises providing an inverter within an uninterruptible power supply (UPS).

* * * * *